US007613687B2

(12) United States Patent
Nye

(10) Patent No.: US 7,613,687 B2
(45) Date of Patent: Nov. 3, 2009

(54) SYSTEMS AND METHODS FOR ENHANCING WEB-BASED SEARCHING

(75) Inventor: Timothy G. Nye, Guelph (CA)

(73) Assignee: TrueLocal Inc., Guelph, Ontario (CA)

( * ) Notice: Subject to any disclaimer, the term of this patent is extended or adjusted under 35 U.S.C. 154(b) by 79 days.

(21) Appl. No.: 10/973,660

(22) Filed: Oct. 26, 2004

(65) Prior Publication Data

US 2005/0120006 A1    Jun. 2, 2005

Related U.S. Application Data

(63) Continuation-in-part of application No. 10/856,351, filed on May 28, 2004, now abandoned.

(60) Provisional application No. 60/474,559, filed on May 30, 2003.

(51) Int. Cl.
*G06F 7/00* (2006.01)
*G06F 17/30* (2006.01)

(52) U.S. Cl. .......................................................... 707/3

(58) Field of Classification Search ........................ None
See application file for complete search history.

(56) References Cited

U.S. PATENT DOCUMENTS

| | | | |
|---|---|---|---|
| 4,974,170 | A | 11/1990 | Bouve et al. |
| 5,375,235 | A | 12/1994 | Berry et al. |
| 5,469,354 | A | 11/1995 | Hatakeyama et al. |
| 5,546,578 | A | 8/1996 | Takada |
| 5,659,617 | A | 8/1997 | Fischer |
| 5,682,525 | A | 10/1997 | Bouve et al. |
| 5,685,003 | A | 11/1997 | Peltonen et al. |
| 5,748,954 | A | 5/1998 | Mauldin |

(Continued)

FOREIGN PATENT DOCUMENTS

WO    WO 00/27091    5/2000

OTHER PUBLICATIONS

Shi et al., IDSIS: Intelligent Document Semantic Indexing System, Aug. 25, 2002.*

(Continued)

*Primary Examiner*—Jean B. Fleurantin
*Assistant Examiner*—Aleksandr Kerzhner
(74) *Attorney, Agent, or Firm*—Hamilton, Brook, Smith & Reynolds, P.C.

(57) ABSTRACT

A system for enhancing web-based searching is provided. Categorizing and clustering techniques are used to optimize searching. Businesses are classified using a control group of predetermined categories. The predetermined categories may be SIC codes or headings that are used to describe business activities. The website addresses for a business listed in the control group is determined, and the content of the business's website is extracted. The extracted content is associated with the predetermined category that the business is classified under. The extracted content is used to further enhance the overall classification scheme. The system may compare and match the extracted content with content of other business' websites, which are similarly categorized. If a relevant keyword match is identified in several of the websites, the keyword may be used to update the classification scheme. A new category or sub-category can be created based on this keyword. Furthermore, when a search is performed, the search results are organized by these categories, and using various processes, the most common results are kept and the less relevant results are discarded.

53 Claims, 6 Drawing Sheets

U.S. PATENT DOCUMENTS

| | | | |
|---|---|---|---|
| 5,787,295 | A | 7/1998 | Nakao |
| 5,787,421 | A | 7/1998 | Nomiyama |
| 5,799,184 | A | 8/1998 | Fulton et al. |
| 5,813,006 | A | 9/1998 | Polnerow et al. |
| 5,832,479 | A | 11/1998 | Berkowitz et al. |
| 5,839,088 | A | 11/1998 | Hancock et al. |
| 5,845,273 | A | 12/1998 | Jindal |
| 5,845,305 | A | 12/1998 | Kujiraoka |
| 5,848,409 | A | 12/1998 | Ahn |
| 5,848,410 | A | 12/1998 | Walls et al. |
| 5,852,810 | A | 12/1998 | Sotiroff et al. |
| 5,884,038 | A | 3/1999 | Kapoor |
| 5,890,172 | A | 3/1999 | Borman et al. |
| 5,924,090 | A * | 7/1999 | Krellenstein ............... 707/5 |
| 5,930,474 | A | 7/1999 | Dunworth et al. |
| 5,944,769 | A | 8/1999 | Musk et al. |
| 5,948,061 | A | 9/1999 | Merriman et al. |
| 6,029,165 | A | 2/2000 | Gable |
| 6,070,157 | A | 5/2000 | Jacobson et al. |
| 6,078,914 | A * | 6/2000 | Redfern ..................... 707/3 |
| 6,094,649 | A | 7/2000 | Bowen et al. |
| 6,182,068 | B1 | 1/2001 | Culliss |
| 6,202,065 | B1 | 3/2001 | Wills |
| 6,216,130 | B1 | 4/2001 | Hougaard et al. |
| 6,275,820 | B1 * | 8/2001 | Navin-Chandra et al. ...... 707/3 |
| 6,295,528 | B1 | 9/2001 | Marcus et al. |
| 6,321,158 | B1 | 11/2001 | DeLorme et al. |
| 6,324,645 | B1 | 11/2001 | Andrews et al. |
| 6,324,646 | B1 | 11/2001 | Chen et al. |
| 6,434,548 | B1 | 8/2002 | Emens et al. |
| 6,523,021 | B1 * | 2/2003 | Monberg et al. ............... 707/2 |
| 6,594,682 | B2 | 7/2003 | Peterson et al. |
| 6,665,659 | B1 | 12/2003 | Logan |
| 6,691,105 | B1 * | 2/2004 | Virdy ........................ 707/3 |
| 6,707,421 | B1 | 3/2004 | Drury et al. |
| 6,732,141 | B2 | 5/2004 | Ellis |
| 6,735,585 | B1 * | 5/2004 | Black et al. ................. 707/3 |
| 6,757,730 | B1 | 6/2004 | Lee et al. |
| 6,775,831 | B1 | 8/2004 | Carrasco et al. |
| 6,954,764 | B2 | 10/2005 | Biswas et al. |
| 6,963,897 | B1 | 11/2005 | Hubbard |
| 7,089,301 | B1 | 8/2006 | Labio et al. |
| 7,124,148 | B2 * | 10/2006 | Sauermann ............ 707/103 R |
| 7,233,942 | B2 | 6/2007 | Nye |
| 2001/0011270 | A1 | 8/2001 | Himmelstein et al. |
| 2001/0037332 | A1 | 11/2001 | Miller et al. |
| 2001/0039592 | A1 | 11/2001 | Carden |
| 2002/0029162 | A1 | 3/2002 | Mascarenhas |
| 2002/0038348 | A1 | 3/2002 | Malone et al. |
| 2002/0152222 | A1 * | 10/2002 | Holbrook ................ 707/104.1 |
| 2002/0156917 | A1 | 10/2002 | Nye |
| 2002/0184059 | A1 | 12/2002 | Offutt et al. |
| 2003/0088562 | A1 | 5/2003 | Dillon et al. |
| 2003/0163466 | A1 * | 8/2003 | Rajaraman et al. ............ 707/6 |
| 2004/0260677 | A1 * | 12/2004 | Malpani et al. ............... 707/3 |
| 2005/0149507 | A1 | 7/2005 | Nye |
| 2006/0026152 | A1 * | 2/2006 | Zeng et al. ................... 707/5 |
| 2007/0156677 | A1 | 7/2007 | Szabo |
| 2007/0208740 | A1 | 9/2007 | Nye |

OTHER PUBLICATIONS

Peng et al., Automatic web page classification in a dynamic and hierarchical way, Dec. 9, 2002.*
Chekuri et al., Web Search Using Automatic Classification, Feb. 6, 1997.*
Franklin, How Internet Search Engines Work, Apr. 16, 2003.*
Florida State University, "Standard Industrial Classification (SIC) Codes" (http://web.archive.org/web/20021106150435/http://garnet.acns.fsu.edu/~tchapin/urp5261/topics/sic.htm), Nov. 6, 2002, 1-3.*
Retrieved from the Internet <URL:http://www.hyperbee.com/>[retrieved on Dec. 11, 2001].
Kelsey, D., HyperBee Search Engine Follows Seti@Home Model [online], [retrieved on Dec. 11, 2001]. Retrieved from the Internet <URL:http://newsbytes.com/cgi-bin/udt/im.display.printable?client.id=newsbytes&story.id=172049>.
Retrieved from the Internet <URL:http://www.microsoft.com/streets/> [retrieved on May 23, 2002].
"Location Intelligence Solutions",Retrieved from the Internet <URL:http://www.geotouch.com/content/solutions/li_solutions.html> [retrieved on May 23, 2002].
"Google searches more sites more quickly, delivering the most relevant results", Retrieved from the Internet <URL:http://www.google.com/technology/index.html> [retrieved on May 23, 2002].
thinkstream, welcome to thinkstream technology, Retrieved from the Internet <URL:http://www.thinkstream.com/> [retrieved on Oct. 27, 2000].
looksmart help, Retrieved from the Internet <URL:http://www.looksmart.com/r?page=/help/main.html> [retrieved on Aug. 9, 2000].
Gnutella News, What is Gnutella?, Retrieved from the Internet <URL:http://www.gnutellanews.com/information/what_is_gnutella.shtml> [retrieved on Nov. 13, 2000].
Moritz, G., "SETI and Distributed Computing," Retrieved from the Internet <URL:http://www.gtexts.com/college/papers/s7.html> [retrieved on Oct. 26, 2000].
About the Open Directory Project, Retrieved from the Internet <URL:http://dmoz.org/about.html> [retrieved on Aug. 9, 2000].
Press Releases, milestones and achievements, Retrived from the Internet <URL:http://corp.oingo.com/Press_Releases/PR_Releases/DS_pr_102400.html> [retrieved on Jan. 12, 2001].
raging search, What is Raging Search?, Retrieved from the Internet <URL:http://ragingsearch.altavista.com/cgi-bin/query?pg=acc&v=about> [retrieved on Aug. 9, 2000].
NeGeo Products, Products, Retrieved from the Internet <URL:http://www.netgo.com/product.html> [retrieved on Aug. 15, 2000].
"Geo Tags for HTML Resource Discovery," http://geotags.com/geo/, downloaded May 25, 2000 (22 pp.).
"Enhance your business listing in Yahoo!Yellow Pages," http://yp.yahoo.com/featured, downloaded May 16, 2000 (1 p.).
"Where in the World is netgeo.caida.org?" http://www.caida.org/outreach/resources/papers/inet_netgeo;, downloaded May 18, 2000 (14 pp.).
"GeoTrust—Building Trust," http://www/.geotrust.com/building_trust/, downloaded May 19, 2000 (1 p.).
"GeoTrust—Magazine Have You Been Spoofed?" http://www.geotrust.com/e_mag/feature_editorial, downloaded May 19, 2000 (2 pp.).
"Authentication Service Bureau," http://www.verisign.com/products/asb/ index.html, downloaded Mar. 20, 2001 (1 p.).
"dot com directory," http://www.dotcomdirectory.com/nsi/basic.hm, downloaded May 22, 2000 (1 p.).
"GeoSearch—Localizing Web Searches," http://www.vicinity.com/vicinity/services/GeoSearch_wp.pdf, downloaded Mar. 27, 2001 (6 pp.).
"Dogpile Catalog: Search Results {}", http://catalog.dogpile.com/texis/ catalog/about.html, downloaded Jun. 20, 2000 (3 pp.).
"whereonearth.com—software demos," http://www.whereonearth.com/prod- info/geozip.htm, downloaded Jul. 6, 2000 (2 pp.).
"TraceWare™ 3.0:Geographic Intelligence for E-Business," downloaded from www.digitalisland.net/common/pdf/traceware_ds.pdf(2 pp.).
dot com directory: About the dot com directory™, http://www.dotcomdirectory.com/nsi/about.hm, downloaded May 22, 2000 (1 p.).
"Geotouch," http://www.geotouch.com/content/home.html, downloaded Jun. 19, 2000 (2 pp.).
Vivísimo. [online], [retrieved on Oct. 22, 2004]. Retrieved from the Internet ,URL: http://www.vivisimo.com/search?query=houseplans&v%3Asources=Web.
Vicinity.com, Oct. 12, 2000, http://web.archive.org/web/20000511195011/www.vicinity.com/vicinity/services/sitemaker.html; p. 1-2.

* cited by examiner

File Edit View Favorites Tools Help

Back Forward Stop Refresh Home | Search Favorite History Channels Fullscreen Mail Print Address: [                                                    ] ▽ ↑ Go

430

Unique house plans, home plans, houseplans floor plans
Country house plans to luxury home plans to small houseplans..builders contract us link to us My House Plans Quick search
Adavanced search New..plan order options what's included house plans FAQ home definitions home links......
Description: Search from thousands of unique house plans and home plans on our user-friendly site.
We offer every style from Country to Victorian and have garage plans too. Give us a try today and see how
easy it can be!
http://www.houseplans.com - 19KB House plans garage plans home plans & more from All House Plans.com
...House plans created by top home plans designers.... Thousands of house plans available...Newest House Plans...
Description: Searchable by category and by design features. Online ordering.
http://www.altplans.com - 37KB Home improvement house plans remodeling - ImproveNet.com
Planning a home improvement project? Improvenet helps you find the house plans and home remodeling pros you'll need
to get the job done!
http://www.improvenet.com - 25 KB House plans garage plans and home designs online
...America's leading designers of house plans is pleased to present our "Online...When looking for house plans, turn to one of
North America's... affordability, we have created unique house plans, which translates into beautiful...
Description: House plans in an online searchable catalog.
http://www.nicehouse.web.com - 9 KB Remodeling home improvement historic restoration how-to and house plans - The Old
...The Boards House Plans...House Plans...and power tools; house plans; supplies....
Description: Remodeling and historic restoration how-to and do-it-yourself advice for owners of historic, old and antique houses
with house plans, building products and a guide to suppliers.
http://www.oldhouseweb.com - 47 KB Result Page: 1 2 3 4 5 6 7 8 9 10 Next     ▶     535

Clusters    plans, design, construction & maintenance (55)        Multimedia: 6,050 Pictures
            construction, Memphis, Tennessee (5)                              1 Video files
            architecture, arts, books (3)
            periods & styles, history, architecture (3)
            house plans section, topics (5)
            house plans, section, relevant topics (3)
            popular house plans, homepopular (3)

See our last 10 queries
            [house plans          ] [SEARCH]

Presented by        Opera Compliant
                    Http :: Submit Site :: About Us :: Help

420

```
File  Edit  View  Favorites  Tools  Help
 ←     →    ⊗    ↻    ⌂    |  ⊛      ☆        ⟳    ☒  |  ⬚    ⇱         ⌨       🖶
Back Forward Stop Refresh Home | Search Favorite History Channels Fullscreen Mail Print
Address:
```
```
                  ┌─────────────────┐                      · Advanced search
                  │ house plans     │   [ Search ]          · Preferences
                  └─────────────────┘   Search Tips
                                        □ Find this phrase                                      ▷ ↑ Go
```

Sponsored Links
House Plans Search Engine- Search 11,500 home plans from 80 of the nations leading designers.                Refine
www.coolhouseplans.com/                                                                                      Sugestions to narrow
Architect's Choice Plans- Residential Designers & Architects Free House Plans Review by Style                your search                535
www.house-floor-plans.com/                                                                                   Providing Plans
Results:                                                                                    430              Residential Plans
Relevant web pages                                                                                           Dog House Plans
Showing 1 - 10 of about 2,255,000                                                                            Floor Plans
Unique house plans, home plans, houseplans, floor plans                                                      House Floor Plans
Search from thousands of unique house plans and home plans on our user-friendly site. We offer every         Home Plans
style from County to Victorian and have....
www.houseplansguys.com/                                                                                          (Show All Refinements)
House Plans by Rick Garner
Popular house plans by AIBD/NAHB designer, featuring spacious, cost-efficent layouts and traditional,        Resources
country, European, Georgian and other styles.                                                                Links collections from experts
www.rickgarner.com/                                                                                          and enthusiasts
(Related Pages)
House plans for your dream home are available at Designhouse                                                 Home Design Help – Stewart
www.design-house.com/                                                                                        Homes Inc.
(Related Pages)                                                                                              www.stewart-homes-inc.com/...
(More results from www.design-house.com)
Review House plans, home plans, floor plans, home designs and                                                House Plans
House Plans, home plans, floorplans reviewed. See all the top homeplan,houseplan and floor plans design      www.richerconstruction.com/...
firms listed and learn secrets that will....
www.homeplaninfo.com/                                                                                        House
Global House Plans                                                                                           www.strikomer.com/...
House plans by top architects and home plan designers in a searchable online catalog.
www.globalhouseplans.com/                                                                                    Homebuyerfirst.com links to House
Architect's Choice House Floor Plans                                                                         Plans & Design
20,000 house plans! Free architect's choice house plan reviews, home quick planners and model kits....       www.homebuyerfirst.com/...
www.house-floor-plans.com/                                                                                   Before The Architect – Shopping
(Related Pages)                                                                                              Lists, House Plans
above all house plans.com with a Point of View, Custom Home Design                                           www.beforethearchitect.com/...
A unique collection of limited edition house plans. Custom home-design & planning services are also....
www.aboveallhouseplans.com/                                                                                  House and Home Plans
(Related Pages)                                                                                              www.calinser.com/...

FIG. 5B

SYSTEMS AND METHODS FOR ENHANCING WEB-BASED SEARCHING

RELATED APPLICATIONS

This application is a continuation-in-part of U.S. application Ser. No. 10/856,351, filed May 28, 2004, now abandoned which claims the benefit of U.S. Provisional Application No. 60/474,559 filed on May 30, 2003, the entire teachings of which are incorporated herein by reference.

BACKGROUND

As the Internet has evolved over the years, there have been a myriad of ideas and schemes used to facilitate information retrieval. The amount of information on the web is growing rapidly, as well as the number of new users who are inexperienced in the art of web research. Increasingly, information gathering and retrieval services are faced with a market full of users that want to be able to search for very specific information, as quickly as possible, and without being burdened with false positives.

Users are likely to navigate the web using human maintained indices, such as YAHOO! and the online yellow-pages, or search engines such as GOOGLE. Human maintained indices cover popular topics effectively; however, they are subjective, expensive to build and maintain, slow to improve, and cannot cover all esoteric topics. Such lists generally group information by predetermined categories. For instance, the online yellow pages organizes its listings by a standard industry code (SIC) scheme. YAHOO! also is based on a taxonomy structure but provides a class-generalization hierarchy of categories to support more sophisticated browsing.

Although human intelligence is used during the classification process for such indexed schemes, this classification process still suffers drawbacks. For example, the quality of web content classification is often skewed as a result of individual reviewer bias. Also, the growth of web content has made it virtually impossible to maintain an up-to-date database of classified web content. The predetermined categories that were once effective to classify information may become stale within a short period of time.

Instead of using indices services, a user can retrieve information using search engines. Search engines, such as GOOGLE, allow a user to enter a query and will return a set of results based on the text from that query. When a query is initiated, the returned set of search results is displayed on one or more search web pages with the search result "hits" arranged in a ranked order. The methodologies that are used to select the hits and rank the search results from most relevant to least relevant vary from search engine to search engine. As a result, performing an identical query on two different search engines rarely, if ever, yields the same set of search results. Even if an identical set of search results is returned, the order in which the search result hits are presented will vary.

The methodologies used by the search engines to determine hits also typically yield search results that include irrelevant hits. For example, if a user looking for "house plans" initiates a search using a web-based search engine, the set of search results may include hits relating to "dog house plans", "bird house plans", and/or hits discussing "budget plans for the white house". In some cases, the majority of the hits will be in the same category and relevant to the search query. Unfortunately, in other cases, very few of the hits will be in the same category and many of the hits will be irrelevant to the search query. This, of course, makes searching frustrating for users.

To address these issues, increasingly the trend is to incorporate a clustering algorithm that clusters search results by grouping certain hits together. Examples of search engines that perform hit clustering include Teoma and Fast. Using such automated clustering techniques is not surprising, given the large number of hits many search queries return, because reliance on people resources to classify billions of web pages into groups is impractical. Unfortunately, these automated computer-driven clustering technologies are rudimentary and prone to error, since no human intelligence is applied to assign context to the search query.

Consumers, for example, want to input minimal information as search criteria and in response, they want specific, targeted and relevant information. Being able to match a consumer's query to a proper business name is very valuable as it can drive a transaction (e.g., a sale). Accommodating these demands effectively unfortunately requires human intelligence, which is not easily captured into a search engine or index scheme without investing in an involved and expensive process. The difficulties of this process are compounded by the unique challenges that companies face to make their presence known to consumers on the internet.

Thus, one of the most complicated aspects of developing an information gathering and retrieval model is finding a scheme in which the cost benefit analysis accommodates all participants, e.g., the users, the businesses, and the search engine providers. At this time, the currently available schemes do not provide a user-friendly, provider-friendly and financially-effective solution to provide easy and quick access to specific information.

SUMMARY

In today's dynamic global environment, the critical nature of accuracy and efficiency in online information retrieval can mean the difference between success and failure for a new product or even a company. Users want specific information, and this information may be targeted to a specific product and to a business in a particular location that carries that product. In addition, users may want to know about other businesses that may also carry that same product or similar products. The current information gathering and retrieval schemes are unable to efficiently provide a user with such targeted information. Nor are they able to accommodate the versatile search requests that a user may have.

The invention relates to a scheme for optimizing information retrieval. An embodiment of the invention relates to a classification system, which is used to optimize Internet searching. Preferably, the system utilizes an existing collection of information that contains verified information about businesses that has been categorized using predefined classifications.

The yellow pages are one example of such a predefined classification that can be used. The yellow pages organizes its listing by subject, using the SIC codes and/or yellow page headings. Generally, businesses in the online yellow pages have an SIC heading or classification that its listings are alphabetized under. These SIC headings, however, follow archaic naming methods, which are often incongruous with typical user queries. For example, the heading for a ladies shoe store is shoes-retail, whereas a consumer is likely to type in "ladies shoes" or "ladies high heel shoes". Brand names present another problem. For example, someone may type in "NIKE" when searching for "running shoes" and neither matches the yellow pages heading, "shoes-retail". In order to compensate for this, yellow pages firms build a table of synonyms so that when someone types in, for example, "ladies high heel shoes" they can match this to a yellow page category. This process is very time consuming as the matching is done manually and there are hundreds of millions of phrases to match. There are some tricks involving root expanders, such as by adding/subtracting characters, (e.g., adding "s" to match "restaurant" to "restaurants") but this only helps a fraction of the cases. Further, this manual processing is very expensive and labor intensive, as synonym tables quickly go stale as a result of the constant influx of new phrases incorporating new brands. Being able to match a consumer's query to a proper business name is very valuable as it can drive a transaction (e.g. sale), and the business will pay for this service of being connected to the user.

Embodiments of the invention relate to an information gathering system that can continuously expand existing classification schemes into more comprehensive, versatile and efficient taxonomies. Existing predefined taxonomies, such as the yellow pages, which assign categories to entities or businesses, may be used as part of the foundation of the system. The website addresses for a business, which is listed in the yellow pages may be determined. The content of the business's website may be extracted and associated with the yellow pages category of the business. The extracted content may be used to further enhance the classification scheme by defining a relationship between the extracted content and the yellow pages category of the business. For example, the extracted content may be compared with the extracted content of another website of a business. Content extracted from a plurality of websites may be analyzed to identify matching keywords or phrases. Machine learning and processing techniques may be used to identify matches in the extracted content. If a match identified is determined to be the best match, e.g., the highest ranking match, the match may be used to update the classification scheme. In this way, a new category or sub-category can be created based on this keyword or phrase. A sub-category, for example, may be created if a certain percentage of the matches are derived from websites of businesses that have been categorized under the same predefined classification, such as the same yellow pages business descriptor. For example, if the keyword match is a product name, such as NIKE, the system may use this product name to create a sub-category under shoes-retail. In this way, the system can continuously update its classification scheme to optimize searching. If a user queries the system for NIKE, the system can respond with all of the websites of businesses classified under this sub-category.

If a user queries the system for a term, which the system had not previously categorized within the classification scheme, all websites containing potential matches may be grouped and identified and the system can produce search results based on the best match. For example, the system categorizes each business's website and businesses within the classification scheme. The content of each business's website is indexed in a table associated with the website. The queried term can then be processed through the indexed content of the websites. All hits can be filtered or tuned using processing techniques that enable the system to identify the best match. When the system determines that it has identified the correct match, the user's search query may be used to update the classification scheme by creating a new category or sub-category based on the query. The system can, therefore, use the user's query to update its classification scheme.

Businesses that do not have a website can be assigned to categories created in the classification scheme. If, for example, the business is associated with a yellow pages classification, such as shoes-retail, it can be associated with any sub-categories under the node shoes-retail, such as NIKE. By associating new classifications to businesses that do not have websites, businesses without websites can be linked to potential customers. This can be particularly useful when a user searches for a business in a particular geographical location that does not have any businesses with websites that relate to the query. For example, if a consumer queries the system for businesses in a particular location that carry NIKE, and the system does not identify any businesses in that location associated with NIKE that have websites, the system can link the query to businesses that may not have websites, but are associated with NIKE because they are under the shoes-retail classification.

The classification scheme may be defined as a hierarchy of relations. Business related categories defined by the yellow pages, for example, may be used in defining the hierarchy. The hierarchy may be a classification hierarchy. A plurality of relations corresponding to each category in the hierarchy may be defined. The relations may be indicative of an association between the category and website content associated with a business classified under that category. The relations may be indicative of an association between the category, the website content, and a new category, which has been defined based on the website content. The relationships in the hierarchy may be defined according to geographical location.

The website content of a business associated with a predetermined classification, such as an SIC classification, yellow pages, etc. may be used to create a control group. The control group may correspond to attributes about entities that are associated with predefined categories, which have been verified by an independent source. The control group may include attributes of the entities, such as the business' names, addresses, telephone numbers and website addresses. The control group may be used to search for other businesses that have not been categorized, and to assign categorizations to these businesses. Attributes in the content of an unclassified business's website can be used to further develop the classification scheme.

The categorized entities in the control group may be stored according to a classification hierarchy of relations. An unclassified business's website may be categorized in the hierarchy by comparing the content of the unclassified website with the website content in the control group. For example, the unclassified business's website may be assigned to a classification in the hierarchy by identifying matching content (e.g. identifying matches in the extracted website content of the unclassified content, that match content associated with a category in the classification hierarchy).

Techniques may be used to optimize clustering of search results. The classification hierarchy (classification scheme) may be used to cluster search results. The search results can be clustered based on predetermined criteria. For example, a user may submit a search query to the system. The system may extract website content associated with the search results. The search results may be grouped based on keywords identified in the extracted website content. The groups may correspond to the categories in the classification hierarchy. Groups that have hit counts below a specified level can be removed. The remaining groups of hits can be analyzed. The system may extract the website content associated with the search results and compare the content against the website content of entities categorized in the control group. The number of matches can be identified, matched, and counted. The search result may be assigned to the category that corresponds to the highest ranking match.

A web-based search engine may be provided that returns hits based on a text query. Filtering and organizing techniques may be used to discard hits returned during the query that are irrelevant to the context of the query. Such techniques may be used to group remaining hits into related categories. Search results may be filtered to remove irrelevant hits and the remaining hits are grouped into categories resulting in groups of hits that are likely to be related to the context of the search query.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 5A-B are diagrams that depict graphical user interfaces of full text search engines incorporating clustering to group search results.

DETAILED DESCRIPTION

A description of preferred embodiments of the invention follows.

System Architecture

Figure 1:
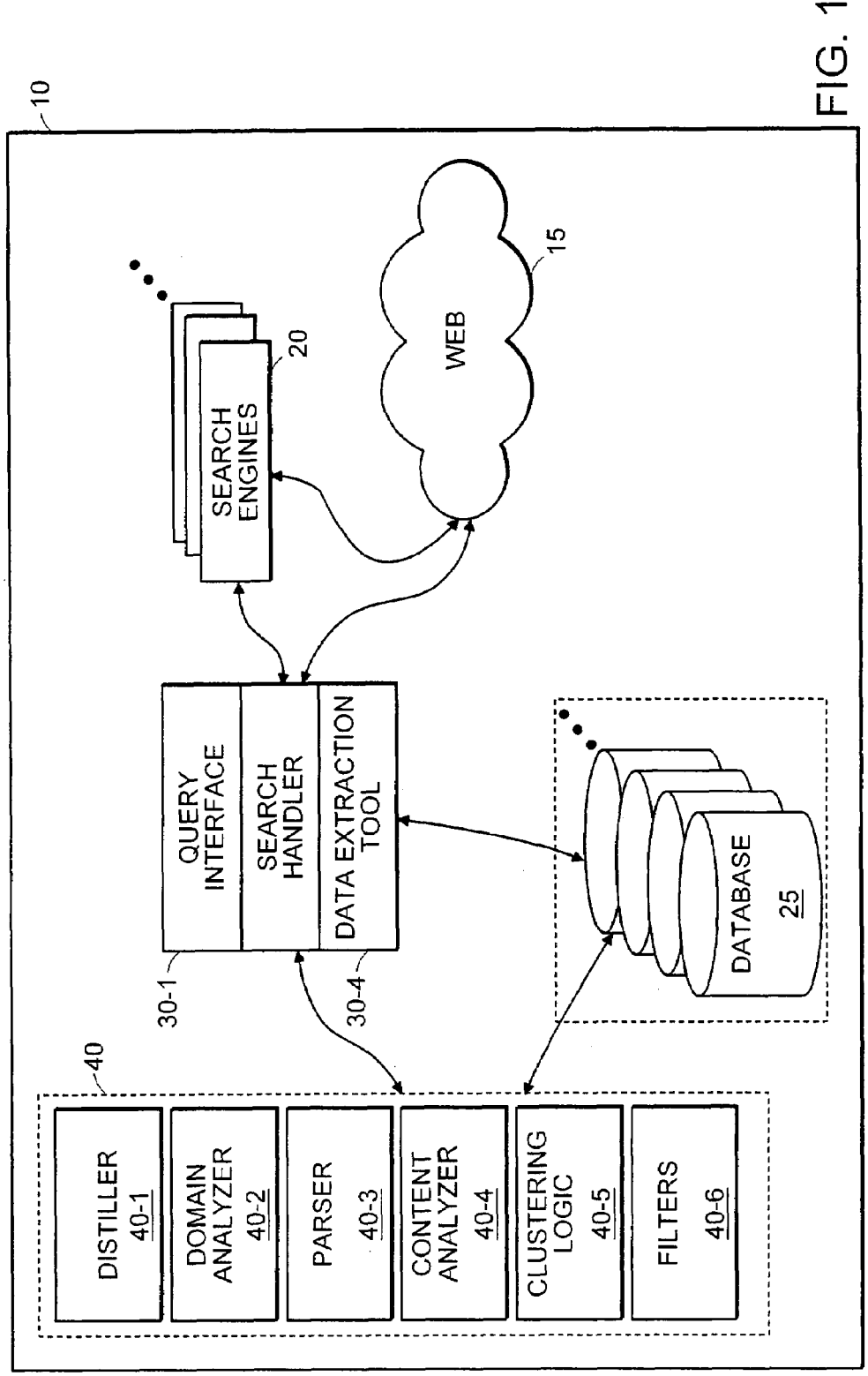
FIG. 1 is a schematic diagram that depicts the architecture of a system for classifying information according to an embodiment of the present invention.

Preferably, the invention is implemented in a software or hardware environment. One such environment is shown in FIG. 1. In this example, a system 10 is provided for classifying information. The system 10 includes a data extraction tool 30-4 that crawls the web 15. The data extraction tool 30-4 extracts full text (attributes from websites). The extracted attributes may relate to information about a business, such as its products, activities, physical location, customers, services, etc. The business may or may not have a website on the Internet. The data extraction tool 30-4 may interface with existing search engines 20, such as GOOGLE or YAHOO!, to extract any indexed information for websites.

A content analyzer 40-4 is used to analyze and classify the extracted attributes, which are received from the data extraction tool 30-4. The content analyzer 40-4 categorizes the extracted attributes using various machine learning and matching techniques. While categorizing the extracted attributes, the content analyzer 40-4 interfaces with, among other things, a persistent storage that consists of a collection of information 25. Preferably, the information is organized in a hierarchical structure. The collection of information 25 may be a database that includes information categorized using an existing taxonomy, which has been obtained from a verified or independent source.

Existing taxonomies that assign categories to entities or businesses are used as part of the foundation of the system 10. One such example is the standard industry classification (SIC) scheme (see the North American Industry Classification System), which aims to provide a large public taxonomy for reuse. SIC codes are numerical values used to categorize and uniquely identify business activities. Each SIC code corresponds to a business descriptor. The yellow pages, for example, typically uses the business descriptors associated with SIC codes to classify content. Another example of a classification system is Open Directory (also known as DMOZ), which provides a user-generated dictionary for the web. Other potential sources of categorized information include BETTER BUSINESS BUREAU membership list and AMERICAN ASSOCIATION OF RETIRED PERSONS (AARP) membership list. It should be noted that any standardized classification scheme is compatible with the invention.

The business information listed in the yellow pages, membership lists, etc, is stored in the database 25. The website content of the businesses listed is extracted and associated with the business's in the classification hierarchy in the database. The website content of the businesses, and the categories of assigned to the businesses by the yellow pages, for example, are stored in the database 25 and used to establish a control group, which defines a classification scheme (classification hierarchy) for the system 10.

When crawling, categorizing, searching or clustering web content, the system 10 may use a variety of processing techniques 40. These processing techniques may include distiller 40-1, domain name analyzer 40-2, parsers 40-3, content analyzer 40-4, clustering logic 40-5, and filters 40-6. The domain name analyzer 40-2, for example, may be used to analyze domain names in URL addresses identified when crawling or searching the web 15. The parsers 40-3 and filters 40-6 may be used by the system 10 to target a user's search query to a specific context, category or subject. The distiller 40-1 may be used to eliminate false positives from search results. Preferably, the domain analyzer 40-2, parsers 40-3, filters 40-6 and distiller 40-1 are implemented using the techniques described in U.S. application Ser. No. 10/772,784, filed Feb. 5, 2004, the entire teachings which are incorporated herein by reference.

The database 25 preferably includes a classification hierarchy that defines a plurality of relations. The relations include yellow pages categories, businesses associated with those categories, geographical locations associated with those businesses, and website content of the businesses. For example, the content analyzer 40-4 interfaces with the data extraction tool 30-4 to extract website content of websites associated with businesses listed in the yellow pages. This website content is associated with the yellow pages category related to the business. This can be used to create a plurality of relations that associate the website content of a business with its yellow pages category in the classification hierarchy.

Assigning Algorithm

Figure 2:
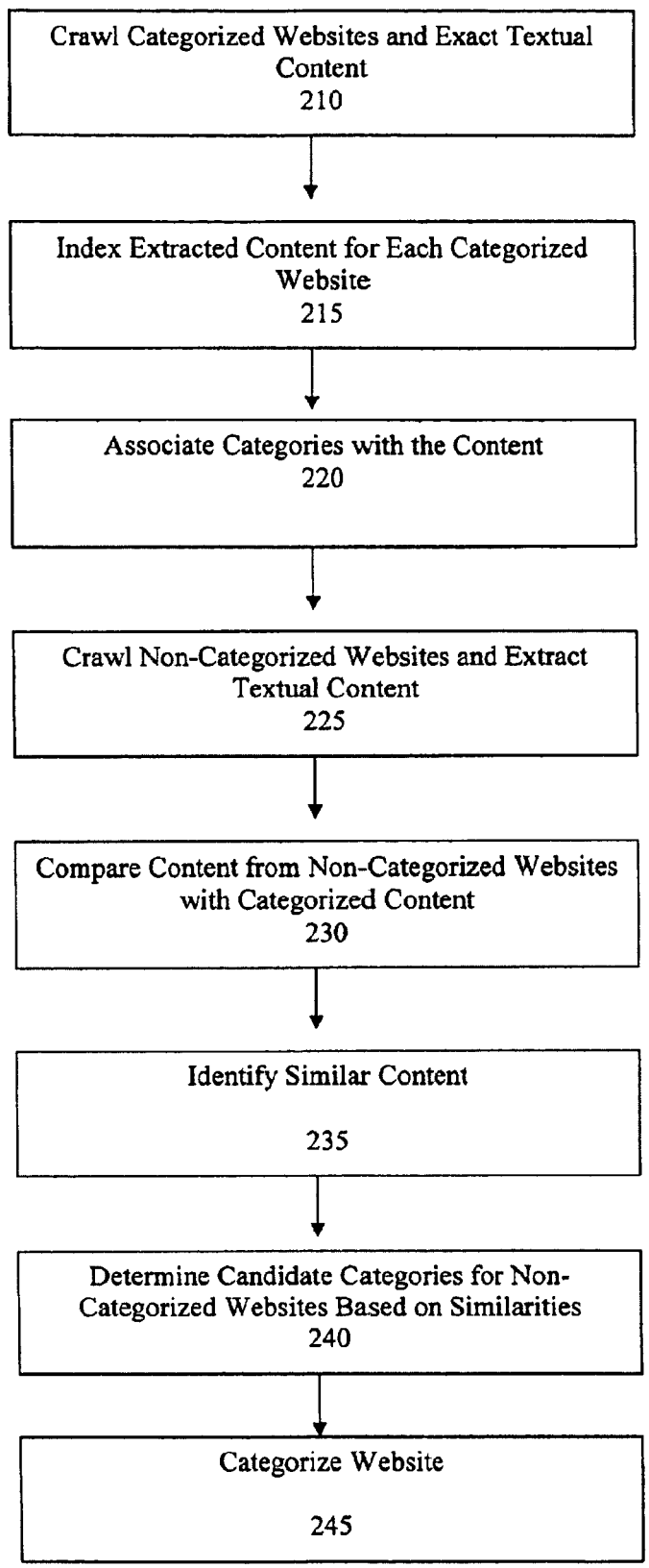
FIG. 2 is a flow diagram that depicts a process for classifying websites according to an embodiment of FIG. 1.

FIG. 2 shows a process for classifying websites according to an embodiment of FIG. 1. At step 210, the websites of businesses that are associated with known classifications, such SIC codes, are identified and crawled. The URL address for each business's website may be determined using techniques described in U.S. application Ser. No. 10/620,170, filed Jul. 15, 2003, and U.S. application Ser. No. 10/772,784, filed Feb. 5, 2004, the entire teachings of which are incorporated herein by reference.

Content is extracted using the data extraction tool 30-4 from these classified websites, such as full text, keywords, descriptions, titles, metadata, etc., and this information is stored in an indexed database 25, as described at 215. The content of each business's website, for example, may be stored in a table index. It should be noted that the system may gather some or all of this content using existing Internet search engines, such as GOOGLE, and directory based Internet services, such as YAHOO!.

At 220, a business's website content is correlated with the business's SIC classification. This content is stored in the database 25 and associated with the business yellow pages descriptor or SIC code. Any attributes, such as keywords extracted from the business's website, are associated with the business's yellow pages descriptor. Such keywords may include the brands names and product information discussed on the website. For example, if the business is categorized in the yellow pages under Retail Shoe Store, the system 10 may associate keywords in its content with the Retail Shoe Store descriptor. If, for instance, the webpage includes brand names, such as "NIKE" and "ADIDAS," as well as descriptive key terms, such as "running shoes" or "ladies high heels", this content may be extracted from the website and then associated with the Retail Shoe Store category.

As this process is repeated for each website of a business that is classified under a SIC category, each SIC category becomes more comprehensive and versatile. In addition, the key terms used to further develop each SIC category can be divided into sub-categories using ranking or pattern recognition algorithms discussed in more detail below. In this way, content extracted from websites of businesses can be used to build and enhance each yellow pages descriptor or SIC category. Computational techniques can also be used to increase the relevancy of the resulting index by filtering irrelevant key terms that are extracted from the sites, as will be discussed in more detail below.

At 225, the crawler crawls the web and extracts content from websites that have not been classified. These "unclassified" websites are not known to be associated with a business that has been assigned an SIC category or yellow pages descriptor. Unclassified websites may also be located using a search engine. The keywords that were extracted from the classified websites and stored under yellow pages descriptors or SIC categories in the database 25 can be used as search criteria to search for unclassified websites. Any websites identified in the search results that have not been classified can be candidates for SIC classification.

Content extracted from unclassified websites is compared against the classified content at 230. At 235, the content of an unclassified website is matched with content associated with an SIC heading of classified websites in the indexed database. This can be performed using machine learning and pattern recognition techniques that identify relationships between the content extracted from an unclassified website and the key terms categorized under an SIC heading. The system 10 determines candidate categories for the unclassified websites at 240. Computational techniques can be used to cluster and rank the potential candidate categories under which the unclassified website may potentially be classified. At 245, the unclassified website is assigned to an SIC category in the database.

Preferably, this embodiment works similarly to the way clustering engines work now, but is unique in that it uses a predefined humanly classified control group (yellow page headings, SIC codes) to organize the clusters, yet also allows the control group to grow if a large group of results form a cluster but this cluster does not fit into any specific predefined category. As an example, the term ISP is not classified in the SIC codes which were last updated in 1984 before the Internet was very prevalent. However the term ISP may occur in many sites and form a cluster, labeled ISP providers, that gets added to the control group as its own category. The clustering of ISP providers using keywords itself is not novel but is an improvement upon the main idea of using a control group to map clusters of results. Mapping clusters without a control group as used by engines such as Vivisimo and Teoma is very scalable but quite unwieldy and very difficult to interface with another fixed hierarchy system.

The content from the unclassified websites may also be used to supplement the key terms associated with an SIC category. Sub-categories can be created using the key terms under the SIC category. This may further enable each SIC category to become more comprehensive. Ranking algorithms may be used to filter irrelevant content. In this way, the system can avoid associating the SIC categories with irrelevant key terms extracted from the unclassified websites.

Increasing the Relevancy of Resulting Indices

By performing the process described in FIG. 2, an unclassified website can be classified. When all of the potential matches that an unclassified website may be classified under are counted, the relevant matches occur far more often than the mismatches. For example, if the unclassified website includes the key phrase "ladies high heel shoes", and this phrase is compared against the indexed database, the following SIC matches may result:

Shoes-retail [23739]
Custom and orthopedic shoes [9567]
Leather goods [9382]
Bridal shops [7599]
Kids clothing [3453]
Apparel and garments—retail [1987]
Clothing—retail [1852]
Radio stations [745]
Shoe Manufacturers [546]
. . .
Credit Unions [234]
. . .
Toys—retail [36]
Shipping yards [7]
Total results [68459] total categories [137] average [500] median [110]

There are a number of techniques that can be used to determine the best match, among a number of potential matches, under which an unclassified website should be categorized (performed at 240 of FIG. 2). The following are some example techniques that could be used to determine the best match:

1. Only the highest match is accepted.
2. Only records above a certain percentage of the total are matched.
3. Only the records that are part of the top X percent are included.
    a. For example, if 50% [34230] then the first three would match [23739+9567+ some of 9382].
4. Only the top record and records which were over x % of the top listing.
    a. For example, if 30% then all records with more than 7121 [23739×30%] would match which is 3 more records in this example.
5. Only records that are above a multiple of the average.
    a. For example, if 10×, then only records above a count of 5000 would be included.
6. Only records in the same parent category as the main category.
7. Only records which contain one of the words from the yellow pages category.

8. Only records which contain one of the words from the main listing but common words in a defined list are excluded (e.g. retail, manufacturers, products, associations).
   a. Handles irrelevant cases from above example.
   b. Could have a minimum value requirement to exclude firms, such as 'shoe manufacturers'.
9. Number of results could be fixed to 1, 2, 3, or other number.
10. All or portion of the results would be saved and depth specified by the consumer.

The above listed techniques are examples of approaches that may be used to determine the best match in the search results.

Indexed Hierarchy

Traditionally, the online yellow pages enables a user to identify a business by specifying a location and a business name or its category. For example, the query "restaurant" would match "Fred's Family Restaurant" or "Bob's Diner". "Fred's Family Restaurant" is a business name match and "Bob's Diner" matches the yellow pages heading restaurant. Generally, businesses in the online yellow pages are alphabetized under a common business descriptor, which corresponds to a SIC heading. Headings alone, however, are often not very useful in this type of matching because they follow archaic naming methods, which are often incongruous with typical user queries. For example, the yellow pages heading for a ladies shoe store is Shoes-Retail; whereas, a consumer is likely to type in "ladies shoes" or "ladies high heel shoes".

Embodiments of the system described in FIGS. 1 and 2 use machine learning techniques to associate the yellow pages category, for example, shoes-retail, with keywords extracted from business's websites. In particular, all businesses under the parent node Shoes-Retail would be classified under that node in the indexed hierarchy 25 stored in the database. Common attributes extracted from those websites would be associated with a sub-category under the Shoes-Retail node. For example, if "high heels" was an attribute common to businesses listed under the Shoes-Retail node, then the system would learn that High Heels is a sub-category of Shoes-Retail.

Geographic Searching

The system 10 is able to optimize searching by using a geographical context in the search criteria. Because the yellow pages listings are organized based on geography and business category, the system 10 preferably associates each business and its attributes with its physical location. This becomes important, for example, when a user queries the system 10 to find a local restaurant or a business that sells a certain type of product. Consider the situation where the query is for business that sells a "waxing" product. In this example, the system would be able to determine whether the user is looking for "leg waxing" or "surfboard waxing" products if the user specifies a particular geographical location. For instance, if Hawaii or California is specified, then the system 10 may conclude that the user is looking for "surfboard waxing" products, and thus return results responsive to this request. If the system 10 is unable to readily determine an appropriate search category for the query, the system 10 may present the user with the potential categories, which are responsive to the query.

Furthermore, the system 10 also categorizes businesses that do not have a virtual location (e.g., a website), but are listed in the yellow pages. These businesses, which do not have websites, are associated with attributes extracted from websites of businesses that are classified under the same yellow pages heading. For example, attributes extracted from a website, which is classified under the yellow pages heading Toys Retail, are associated with businesses that do not have websites but are also classified under Toys Retail. This addresses the situation where a user queries the system for business that sells a product, such as a specific toy in a certain location, and although the system 10 is able to identify businesses classified under Toys Retail in that location, none of the businesses identified actually have websites. This matching connects the user with the business and can potentially drive a sale for the business identified. In this way, the system 10 is able to match a consumer's product query to a proper business name even if the business does not have a website, thus, creating a connection between the user and the business.

Web-based Clustering

Search results returned during a web-based query 30-1 are filtered 40-6 to discard irrelevant hits. The remaining relevant hits are then organized into groups by a clustering algorithm 40-5 according to a hierarchy of relations ("clustered"), which yields a relevant set of search results consistent with the meaning and intent of the search query. In one embodiment, the clustering methodology is used in conjunction with one or more full text-indexed search engines 20.

Figure 3:
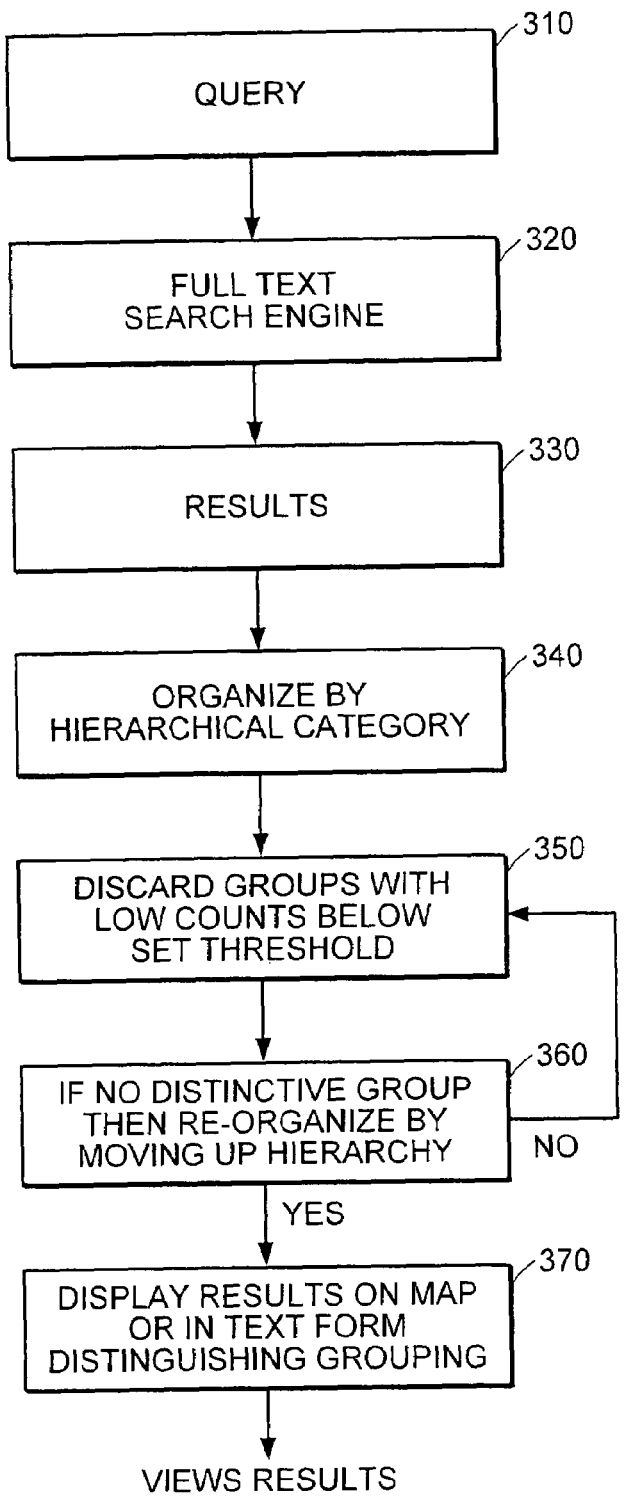
FIG. 3 is a flow diagram that depicts the process performed during a web-based search using a full text indexed search engine in accordance with the present invention.

Referring to FIG. 3, a flowchart showing the process performed during a web-based search using a full text-indexed local search engine in accordance with the present invention is illustrated. When a user wishes to initiate a search, a query is entered into the full text-indexed search engine at 310. Once the query has been initiated, the search engine performs a full text index search of available web pages at 320. The web pages that satisfy the query text are then returned, yielding a set of hits at 330. Hits returned in response to the query are then matched against a hierarchical criteria database at 340. In particular, content is extracted from the website hits and compared against classification hierarchy stored in the hierarchical criteria database.

The hierarchical criteria database 25 may be created in accordance with the processes described in FIGS. 1 and 2. The database may include business information that has been obtained from the an independent source, such as the yellow pages. The business information may be supplemented with extracted website content (fully indexed) associated the businesses. This extracted website content may be assigned to the business category associated with the business in the classification hierarchy. For example, the database 25 includes a classification hierarchy that defines a plurality of relations. The relations include yellow pages categories, businesses associated with those categories, and geographical locations associated with those businesses. In clustering the search results in accordance with FIG. 3, the website content of the search results may be extracted and matched against the categories in the classification hierarchy, and the content associated with the categories stored in the hierarchal database 25.

During this process, hits that do not match against the database are discarded. Hits that match against the database are organized into groups based on the hierarchy of the database according to set criteria. As a result, hits are grouped in a manner that is consistent with the intent and meaning of the search query. In one preferred implementation, the criteria database includes a classification hierarchy, which defines a plurality of relations associated with businesses and SIC codes, allowing the relevant hits to be grouped according to SIC code.

After the hits have been grouped, each group of hits is then examined to determine if the group hit count is above a threshold value at 350. In this example, the threshold value is an integer number of hits. If no group includes a hit count above the threshold value, the criteria for database matching is adjusted at 360 and the organization of the hits into groups is re-performed at 350. During the criteria adjustment, the matching criteria are moved up the hierarchy of the database. The groups of hits are then re-examined to determine the groups that have hit counts above the threshold value. If still no group includes a hit count above the threshold value, the criteria for database matching is adjusted yet again, and 350 and 360 are repeated. This process is repeated moving up the hierarchy of the database until one or more groups of hits are returned that have hit counts above the threshold value.

When one or more groups have hit counts above the threshold value, the groups of hits are displayed to the user in a manner that allows the user to visually distinguish between the groups of hits at 370. The user is then able to select each group of hits and view the web pages linked to the hits within the group.

Figure 4:
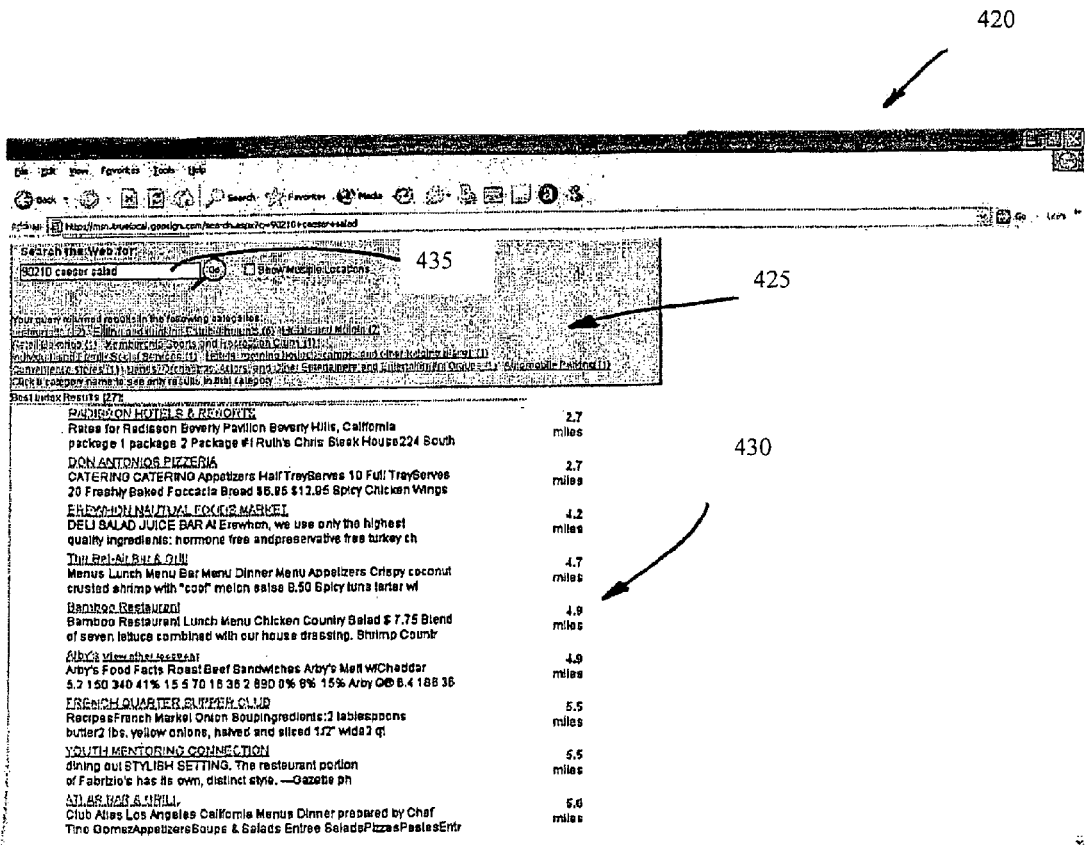
FIG. 4 is a diagram that depicts a graphical user interface of a mock-up full text indexed search engine incorporating clustering to group search results.

For ease of understanding, an example of a search query performed on a full text indexed local search engine that performs clustering in accordance with the present invention will now be described. Turning to FIG. 4, the graphical user interface of the full text indexed local search engine is shown and is generally identified by reference numeral 420. As can be seen, the search engine includes a text field 435 into which a search query is entered. In this example, the query "90210 Caesar salad" is entered into the text field 435 and the search is initialized. In response to the query, the search engine returns a set of indexed results that have the words 'Caesar' and 'salad' and are in the 90210 zip code. The returned search result hits are matched to the SIC codes in the criteria database to determine relevant and irrelevant hits. The irrelevant hits are discarded and the relevant hits are grouped according to SIC code. Each group is then displayed as a heading, with counts showing the number of hits in each group, as shown below and as identified by reference numeral 425 in FIG. 4:

restaurants (12) Eating and drinking Establishments (6), Hotels and Motels (2.) Retail Bakeries (1) Membership Sports and Recreation Clubs (1) Individual and Family Social Services (1) Hotels, rooming houses, camps, and other lodging places (1) Convenience stores (1) Bands, Orchestras, Actors, And Other Entertainers and Entertainment Groups (1) Automobile Parking (1)

In this particular example, the search engine also displays a list of all of the relevant hits as identified by reference numeral 430. Selecting one of the headings results in the search engine presenting only the relevant hits in the associated group.

As can be seen, the restaurants group includes 12 hits, or 44% (12/27) of the total search result hits. Statistically, this is a strong indication that the query "Caesar salad" is most commonly associated with restaurants. Table 1 below shows the SIC codes associated with the group categories, as well as the hit count for each group. In this particular example, the set criteria used to group hits returned during the query is commonality of the first three digits of the SIC codes.

TABLE 1

| Group Category | SIC Code | Hit |
|---|---|---|
| Restaurants | 58200000 | 12 |
| Eating and Drinking Establishments | 58100000 | 6 |
| Hotel and Motel | 70110000 | 3 |
| Retail bakeries | 54610000 | 1 |
| Memberships - Sports and Recreation Clubs | 79970000 | 1 |
| Individual and Family social services | 83200000 | 1 |

TABLE 1-continued

| Group Category | SIC Code | Hit |
|---|---|---|
| Convenience stores | 54110200 | 1 |
| Bands, orchestras, actors | 79290109 | 1 |
| Automobile parking | 75210000 | 1 |

In this example, if the search criteria fails to return one or more groups having a hit count above the threshold value, the set criteria used to group hits returned during the search query is moved up the hierarchy to two digit SIC codes as shown in Table 2 below.

TABLE 2

| Group Category | SIC Code | hit count |
|---|---|---|
| Eating and drinking establishments | 58000000 | 18 |
| Hotel and Motel | 70000000 | 3 |
| Food stores | 54000000 | 2 |
| Amusement and recreation services | 7900000 | 2 |
| Social services | 83000000 | 1 |
| Automotive repair, services and parking | 75000000 | 1 |

The search criteria, if required, could be moved up the hierarchy even further to one digit SIC codes, as shown in Table 3 below.

TABLE 3

| Group Category | SIC Code | Hit Count |
|---|---|---|
| Eating and drinking establishments | 58000000 | 18 |
| Food Stores | 54000000 | 2 |

If desired, rather than displaying headings representing each of the groups having hit counts greater than the threshold value, only the heading associated with the group having the highest hit count can be displayed. If this is done, the displayed group will, for the most part, yield the most relevant group of hits for most users. A link to the other groups having hit counts greater than the threshold value 15 but lower than the highest hit count can also be displayed.

Alternatively, the groups of hits to be displayed can be based on a relevancy percentage of hits per group versus total search result hits. Thus, if the relevancy threshold is set, for example, at 15%, and a search resulted in a total of twenty-seven (27) hits, only groups having a hit count greater than 0.15×27=4.05 (rounded up or down) would be displayed.

For example, using the results of Table 1, the "Restaurants" and "Eating and drink establishment" groups would meet the relevancy threshold. By using less specific clustering and moving up the hierarchy, the relevancy percentage can be increased. Using the results of Table 2 where the clustering criteria have become more general, the main group represents 66% of the search results.

As will be appreciated by those of skill in the art, adjusting the criteria either up or down the hierarchy will change the number of groups that satisfy the threshold value. The criteria and threshold values may be fixed or user adjustable.

FIGS. 5A and 5B show graphical user interfaces of full text search engines incorporating clustering to group search results. Referring to FIG. 5A, the graphical user interface 420 presents the group headings 535 below the search result hit list 430. Referring to FIG. 5B, the graphical user interface 550 presents the group headings 535 to the side of the search result hit list 430.

By organizing search results into groups of hits, visual displays or maps where the search results are displayed can be improved. In the above examples, without clustering, there is no mechanism for a user to see what listings may be similar. Clustering is also useful in a yellow pages implementation, where there is no full text index but the categories are known. In this case, clustering is used on the yellow page headings. For example, if there are ten different yellow pages categories and a different color is assigned to each category, confusion arises because different shades of the same color must be used to differentiate between various groups. By using clustering, the irrelevant hits can be eliminated and/or hits can be grouped resulting in fewer categories. As a result fewer colors are required, making categorization visually more evident.

It will be apparent to those of ordinary skill in the art that methods involved in the present invention may be embodied in a computer program product. For example, the database 25 described in reference to FIG. 1 may be a collection of information stored on a persistent storage device of any computer usable medium. Such a computer usable medium can comprise a readable memory device, such as a hard drive device (e.g. PC tablet), a CD-ROM, a DVD-ROM, or a disk, having computer readable program code stored thereon. The computer readable medium can also include a communications medium, such as a bus or a communications link, either wired or wireless.

It will also be apparent to those of ordinary skill in the art that the website content extracted, using the data extraction tool 30-4, is described in as extracted textual content for purposes of illustration. Those skilled in the art will appreciate that the content may also be image based. If the content is an image, machine vision techniques can be used to determine descriptive attributes from the images, or from attributes associated with an image.

It should be understood that the optimal parameters/settings for the algorithms described herein, such as the content analyzer 40-4, clustering algorithms 40-5, etc., may be tuned using optimization techniques, such as genetic tuning, machine learning, neural network, Bayesian networks, etc. It should also be understood that the content analyzer 40-4 may utilize support vector machines (SVM) to increase the relevancy of resulting indices.

While this invention has been particularly shown and described with references to certain embodiments thereof, it will be understood by those skilled in the art that various changes in form and details may be made therein without departing from the spirit and scope of the invention as defined by the appended claims.

What is claimed is:

1. An information gathering system implemented in a computer system for optimizing searching comprising:
   a processor and memory;
   a data extraction tool executing in the computer system, in communication with a database, extracting website content to enable full text searching, the website content being extracted from a plurality of websites associated with business entities that are classified according to a standard industry classification system (SIC), which is a predefined taxonomy of business activities having verified information about the business entities;
   the database, in communication with the data extraction tool, storing the extracted website content according to a classification system that is based on the predefined taxonomy of SIC business activities;
   a content analyzer, in communication with the database, identifying commonly occurring keywords in the extracted website content from the websites of business entities that are similarly classified in the SIC predefined taxonomy of SIC business activities, where the commonly occurring keywords identified are used to update the classification system, the updated classification system being used to optimize searching in response to search queries;
   the content analyzer identifying commonly occurring keywords that are used to create a new category to update the classification system by:
      identifying keyword matches in the extracted website content by identifying any commonly occurring keywords or phrases in the extracted website content; and
      processing the matches identified by determining whether any of the keywords or phrases in the identified matches contain one or more keywords associated with any of the business activities in the SIC predefined taxonomy; and
   a full text indexed search engine, in communication with the database, processing a search query by matching the search query against the database, where at least a portion of the search results are clustered based on their respective SIC business activity category.

2. An information gathering system for optimizing searching as in claim 1 wherein the SIC predefined taxonomy of SIC business activities are not computer generated.

3. An information gathering system for optimizing searching as in claim 1 wherein storing data concerning business entities according to a classification system further includes storing verified attributes about the business entities including at least one of: business name, business address, business telephone number, or business website address.

4. An information gathering system for optimizing searching as in claim 1 wherein the business entities correspond to corporations, agencies, or organizations.

5. An information gathering system for optimizing searching as in claim 1 wherein each of the business activities in the SIC predefined taxonomy corresponds to a business descriptor.

6. An information gathering system for optimizing searching as in claim 1 further includes a search handler which identifies the website content and causes the data extraction tool to extract the identified website content.

7. An information gathering system for optimizing searching as in claim 6 wherein the search handler identifies the website content through a search engine.

8. An information gathering system for optimizing searching as in claim 7 wherein the data extraction tool extracts the website content from indexed data provided by the search engine.

9. An information gathering system for optimizing searching as in claim 6 wherein the search handler identifies the website content through a website address of the business entity.

10. An information gathering system for optimizing searching as in claim 1 wherein processing matches identified further includes a process for eliminating irrelevant matches.

11. An information gathering system for optimizing searching as in claim 1 wherein matches identified further includes a process for:
   ranking each of the matches identified; and
   processing the ranked matches to determine the highest ranking match.

12. An information gathering system for optimizing searching as in claim 1 wherein processing matches identified further includes the following processes:

determining whether any of the identified matches were extracted from two or more websites that are associated with any of the same business activities in the SIC predefined taxonomy;

computing the identified matches and determining whether any of the matches exceed a certain percentage of the computed total; or computing the identified matches and eliminating matches that are below a certain percentage of the computed total.

13. An information gathering system for optimizing searching as in claim 11 wherein updating the classification system further includes using the highest ranking match to update the classification system by creating a new category in the classification system based on the highest ranking match.

14. An information gathering system for optimizing searching as in claim 13 wherein the update to the classification system causes a sub-category of one of the business activities in the SIC predefined taxonomy to be created, where the sub-category is indicative of an association between one of the business activities of the SIC predefined taxonomy and the extracted content.

15. An information gathering system for optimizing searching as in claim 1 further including a search process that locates websites of business entities that have not been categorized in the SIC predefined taxonomy of SIC business activities.

16. An information gathering system for optimizing searching as in claim 15 wherein the data extraction tool extracts content from the websites that have not been categorized in the SIC predefined taxonomy of SIC business activities.

17. An information gathering system for optimizing searching as in claim 16 wherein the extracted content from the websites that have not been categorized in the SIC predefined taxonomy of SIC business activities is used to update the classification system.

18. An information gathering system for optimizing searching as in claim 1 further includes a search process to identify business entities associated with one or more of the business activities in the SIC predefined taxonomy, which do not have a website.

19. An information gathering system for optimizing searching as in claim 18 wherein the process to identify business entities associated with one or more of the business activities in the SIC predefined taxonomy, which do not have a website, further includes logic to assign each of the business entities identified to new categories created in the updated classification system.

20. An information gathering system for optimizing searching as in claim 1 wherein the classification system includes categories based on geographical locations, where the geographical locations are used to eliminate false positives in search results resulting from a keyword search query when one of the terms in the keyword search query has more than one meaning in the classification system.

21. An information gathering system for optimizing searching as in claim 1 wherein the classification system further includes logic that processes queries to identify business entities that are geographically located within a certain distance from a particular location.

22. An information gathering system for optimizing searching as in claim 1 wherein the updated classification system is used by the full text indexed search engine to process queries for business entities.

23. An information gathering system for optimizing searching as in claim 22 wherein the query includes attributes matching one or more categories in the updated classification system, where one or more business entities is responsive to the query.

24. An information gathering system for optimizing searching as in claim 1 wherein the categories in the updated classification are used to cluster search result hits.

25. An information gathering system for optimizing searching as in claim 1 wherein the full text indexed search engine further includes:

a search handler being responsive to a user search query; and a clustering engine, in communication with the search handler, processing search result hits resulting from the query, where the clustering engine clusters the search result hits based on categories defined in the classification system.

26. An information gathering system for optimizing searching as in claim 1 wherein the full text indexed search engine processing a search query by matching the search query against the database, where at least a portion of the search results are clustered further includes:

returning a set of indexed results having content matching the search query;

matching the returned indexed results to the SIC codes in the database to determine hits; and grouping the hits according to their respective SIC code.

27. An information gathering system for optimizing searching as in claim 26 wherein grouping the hits according to their respective SIC code further includes:

determining a group hit count for each group;

determining if the group hit count is above a threshold value;

displaying groups of hits that are above the threshold value, where each of the displayed groups of hits are displayed with a heading corresponding to their respective SIC code and with counts showing the number of hits in the group, where the SIC code heading displayed is an associated SIC business descriptor.

28. An information gathering system for optimizing searching as in claim 27 further includes responding to a selection of one of the SIC code headings by presenting hits in the group corresponding to the selected SIC code heading.

29. An information gathering system for optimizing searching as in claim 27 wherein grouping the hits according to their respective SIC code further includes using the first three digits of the SIC codes to group hits.

30. An information gathering system for optimizing searching as in claim 29 wherein if the search fails to return one or more groups of hits having a count above the threshold value, using the first two digits of the SIC codes to group hits.

31. A method of optimizing searching in a data processing system comprising the steps of:

identifying websites of business entities that are associated with a standard industry classification system (SIC) predefined taxonomy of business activities having verified information of the business entities;

extracting website content from the websites of business entities that are associated with the SIC predefined taxonomy of SIC business activities to enable full text searching;

processing the extracted content to identify commonly occurring keywords in the extracted content from websites of business entities that have been similarly classified in the SIC predefined taxonomy of SIC business activities, where one or more of the commonly occurring keywords are used to update a classification system, where the classification system is based on the SIC predefined taxonomy of SIC business activities;

creating a new category to update the classification system by:

identifying keyword matches in the extracted website content by identifying any commonly occurring keywords or phrases in the extracted website content; and processing the matches identified by determining whether any of the keywords or phrases in the identified matches contain one or more keywords associated with any of the business activities in the SIC predefined taxonomy;

processing a search query using full text index searching by matching the search query against at least a portion of the extracted content, where at least a portion of the search results are clustered according to their respective SIC business activity category.

32. A method of optimizing searching as in claim 31 wherein the SIC predefined taxonomy of SIC business activities are not computer generated.

33. A method of optimizing searching as in claim 31 wherein processing matches identified further includes:

determining whether any of the identified matches were extracted from two or more websites that are associated with any of the same SIC business activities in the SIC predefined taxonomy;

computing the identified matches and determining whether any of the matches exceed a certain percentage of the computed total; or computing the identified matches and eliminating matches that are below a certain percentage of the computed total.

34. A method of optimizing searching as in claim 33 wherein updating the classification system further includes using the highest ranking match to update the classification system by creating a new classification category based on the highest ranking match.

35. A method of optimizing searching as in claim 31 wherein the update to the classification system causes a subcategory of one of the SIC business activities in the SIC predefined taxonomy to be created, where the sub-category is indicative of an association between one of the SIC business activities in the SIC predefined taxonomy, and the extracted content.

36. A method of optimizing searching as in claim 31 further includes identifying business entities associated with one or more of the SIC business activities in the SIC predefined taxonomy, which do not have a website.

37. A method of optimizing searching as in claim 36 wherein identifying business entities associated with one or more of the SIC business activities in the SIC predefined taxonomy, which do not have a website, further assigning each of the business entities identified to new categories created in the updated classification system.

38. A method of optimizing searching as in claim 31 wherein the classification system includes categories based on geographical locations, where the geographical locations are used to eliminate false positives in search results resulting from a keyword search query if one of the terms in the keyword search query has multiple meanings in the classification system.

39. A method of optimizing searching as in claim 31 wherein the classification system further includes processing queries to identify business entities that are geographically located within a certain distance from a particular location.

40. A method of optimizing searching as in claim 31 further including:

responding to a user search query; and processing search result hits resulting from the query by clustering the search result hits based on categories defined in the classification system.

41. A method of optimizing searching as in claim 40 wherein processing search result hits resulting from the query by clustering the search result hits based on categories defined in the classification system further includes assigning a search result hit to a category in the classification system.

42. A computer implemented system for optimizing searching comprising:

a processor and memory;

means for identifying websites of business entities that are associated with a standard industry classification system (SIC) predefined taxonomy of business activities having verified information of the business entities;

means for extracting website content from the websites of business entities associated with the SIC predefined taxonomy of SIC business activities to enable full text searching;

means for processing the extracted content to identify commonly occurring words in the extracted content from websites of business entities that have been similarly classified by the SIC predefined taxonomy of SIC business activities, where one or more of the commonly occurring keywords are used to update the classification system, where the classification scheme is based on the SIC predefined taxonomy of SIC business activities;

means for creating a new category to update the classification system by:

means for identifying keyword matches in the extracted website content by identifying any commonly occurring keywords or phrases in the extracted website content; and means for processing the matches identified by determining whether any of the keywords or phrases in the identified matches contain one or more keywords associated with any of the business activities in the SIC predefined taxonomy;

means for processing a search query using a full text index searching by matching the search query against at least a portion of the extracted content, where at least a portion of the search results are clustered according to their respective SIC business activity category.

43. A method of optimizing searching in a data processing system comprising the steps of:

obtaining website content of business entities that are included in a control group, where the control group defines a classification system that is based on a standard industry classification system (SIC) predefined taxonomy of SIC business activities having verified information about the business entities, the classification system being used to classify and store the website content of the business entities;

searching for unclassified business entities using at least a portion of the website content of business entities in the control group;

classifying the unclassified business entities based on the portion of website content of business entities in the control group;

identifying commonly occurring keywords in website content of business entities that are similarly classified in the classification system of the control group;

allowing the control group to grow if a substantial amount of commonly occurring keywords have been identified; and creating a new business entities category to update the classification system of the control group allowing the control group to grow by:
  identifying keyword matches in the stored website content by identifying any commonly occurring keywords or phrases in the website content; and
  processing the matches identified by determining whether any of the keywords or phrases in the identified matches contain one or more keywords associated with any of the SIC business activities in the SIC predefined taxonomy; and
using the control group to optimize full text index searching of the website content by organizing search results according to categories in the classification system of the control group.

44. A method of optimizing searching as in claim 43 wherein the business entities correspond to corporations, agencies, or organizations.

45. A method of optimizing searching as in claim 43 wherein the control group includes verified attributes about the business entities including at least one of: business name, business address, business telephone number, or business website address.

46. A method of optimizing searching as in claim 43 wherein obtaining information including website content of the business entities that are included in a control group further includes extracting website content from websites of business entities in the control group.

47. A method of optimizing searching as in claim 46 wherein the SIC control group by creating new categories for the classification system based on the commonly occurring keywords that have been identified, where the step of identifying the commonly occurring keywords includes:
  identifying keyword matches in the extracted website content by identifying any commonly occurring keywords or phrases in the extracted website content; and
  processing the matches identified.

48. A method of optimizing searching as in claim 43 wherein classifying the website based on the information about the business entities in the control group further includes:
  extracting content from a website of an unclassified business entity; and
  comparing the unclassified website content with website content of the classified business entities in the control group to determine the classification of the unclassified business entity.

49. A method of optimizing searching as in claim 48 further includes defining relationships in the classification system according to geographical locations, where geographical locations are used to eliminate false positives in search results from a keyword search query if one of the terms in the keyword search query has multiple meanings in the classification system.

50. A method of optimizing searching as in claim 48 further includes using the control group to cluster search result hits in response to a user search query.

51. A method of optimizing searching in a data processing system comprising the steps of:
  storing website content associated with business entities that are included in a control group, where the control group defines a classification system that is based on a standard industry classification system (SIC) predefined taxonomy of business activities having verified information about the business entities, the classification system being used to classify and store the website content of the business entities;
  responding to a search request by using full text index searching of the website content;
  identifying commonly occurring keywords in website content from the search results and website content of business entities in the control group that are classified in the SIC predefined taxonomy of SIC business activities;
  grouping the search results based on the commonly occurring keywords identified;
  using website content from the search results to allow the control group to grow if a substantial amount of groups of commonly occurring keywords have been identified; and
  creating a new business entities category to update the classification system of the control group, allowing the control group to grow by:
    identifying keyword matches in the stored website content by identifying any commonly occurring keywords or phrases in the website content; and
    processing the matches identified by determining whether any of the keywords or phrases in the identified matches contain one or more keywords associated with any of the SIC business activities in the SIC predefined taxonomy.

52. A method of optimizing searching as in claim 51 wherein grouping the search results based on the commonly occurring keywords identified further includes:
  identifying keyword or phrase matches in website content associated with the search results and website content associated with the business entities in the control group;
  ranking the matches associated with each category of business entities in the control group.

53. A method of optimizing searching as in claim 52 using website content from the search results to allow the control group to grow if a substantial amount of commonly occurring keywords have been identified further includes:
  determining a SIC business activities category in the SIC predefined taxonomy having a highest ranking match of commonly occurring keywords; and
  enabling the category having the highest ranking match to grow if a large group of search results are assigned to the category.

* * * * *

UNITED STATES PATENT AND TRADEMARK OFFICE
CERTIFICATE OF CORRECTION

PATENT NO. : 7,613,687 B2  Page 1 of 1
APPLICATION NO. : 10/973660
DATED : November 3, 2009
INVENTOR(S) : Timothy G. Nye It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 232 days.

Signed and Sealed this

Nineteenth Day of October, 2010

David J. Kappos
*Director of the United States Patent and Trademark Office*